United States Patent Office 3,222,095
Patented Dec. 7, 1965

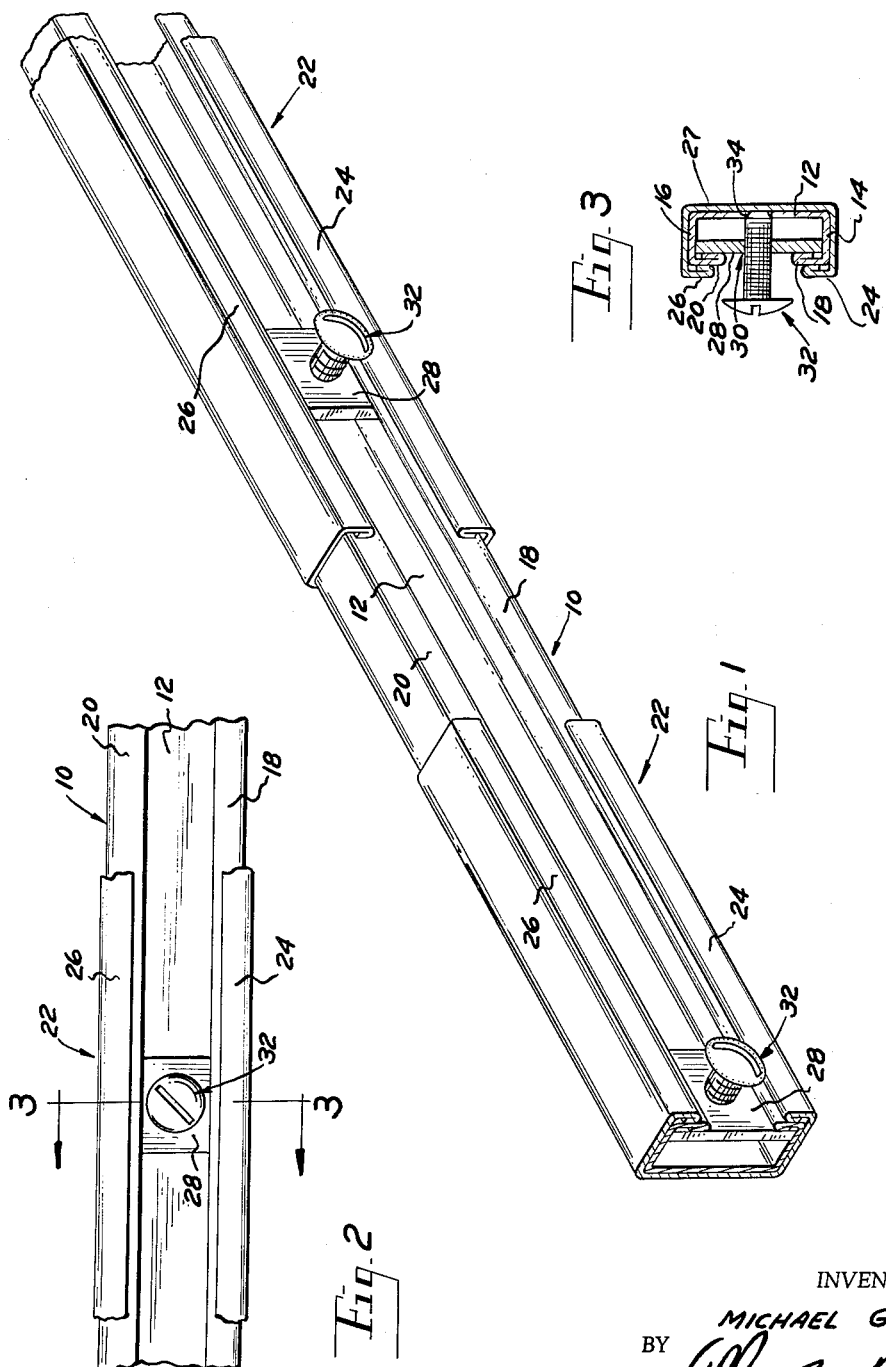

3,222,095
LOCK FOR TELESCOPING RODS
Michael Gerus, 11660 Gallagher, Hamtramck, Mich.
Filed Sept. 10, 1963, Ser. No. 307,933
1 Claim. (Cl. 287—2)

This invention relates to a mechanism for locking telescoping rods with respect to one another and more particularly to a mechanism which is applicable to locking a pair of telescoping channel sections.

Telescoping rods find a wide variety of use in adjustable and collapsible structures and a variety of means are available for locking such telescoping rods with respect to one another.

It is a primary object of the present invention to provide a telescoping rod structure with locking means which is simple in construction so as to be low in cost and reliable in operation.

The present invention takes the form of a pair of telescoping U-shaped channel sections with turned-in lips at their free edges, so as to resemble box sections with a portion of one side removed. In a preferred embodiment of the present invention which will be subsequently described in detail, a short plate extending between the opposing sides or flanges of the smaller channel section immediately behind the turned-in lips is provided at each point along the smaller channel section at which the two channel sections are to be locked together. A screw extends through a central threaded hole in the plate so that the end of the screw fits through a hole in the web of the small channel section and bears against the inner face of the web of the larger section.

Thus the channel sections may be locked together merely by rotating the screw so as to force the plate outwardly against the lips of the small channel section. This causes the lips of the small channel section to bear against those of the larger channel section, thus locking the two members together. The hole in the web of the small channel section prevents the screw and plate assembly from slipping along the length of the rods.

It is therefore an object of the present invention to provide a lock of this type which may be actuated easily and securely.

Another object is to provide a device of this kind which employs a minimum of structural elements and which may be easily replaced or repaired.

Other objects and advantages will be more clearly apparent from the following detailed description of a preferred embodiment of the present invention. The description makes reference to the drawings in which:

FIGURE 1 is a perspective view of a channel section locked to two telescoping channel sections by means of the present invention;

FIGURE 2 is an elevational view of the channel section shown in FIGURE 1 with one of the telescoping sections locked in place; and FIGURE 3 is a sectional view taken along the lines 3—3 of FIGURE 2.

Referring to the drawings in greater detail, a small channel section 10 is provided having a web 12, flanges 14 and 16, and lips 18 and 20 formed by turning the outer edges of the flanges inwardly. As shown, these lips may be formed into a double fold by bending the outermost edges of the flanges back upon themselves. The double thickness thus created provides extra stiffness so as to withstand the pressure applied when the lock is actuated.

In FIGURE 1, two telescoping members 22 are shown. Each of these members is a channel section identical in configuration to that of the smaller section 10 but having slightly larger dimensions so as to slide along the outer surfaces of the web 12, flanges 14 and 16, and lips 18 and 20 of the smaller section 10. Thus the larger sections 22 have lips 24 and 26 which abut the lips 18 and 20 of the smaller section as shown in FIGURE 3, and webs 27 which abut the web 12 of the smaller section.

A plate 28 is provided which extends between the inner surfaces of the flanges 14 and 16 of the smaller section 10 immediately behind the lips 18 and 20 as shown in FIGURE 3. The plate 28 includes a central threaded opening 30. A screw 32 extends through the opening 30, engaging the threads, extends through a hole 34 in the web 12, and bears against the inner face of the web 27 of the larger section 22.

To lock the telescoping channel sections together, the screw 32 is tightened, thus forcing the plate 28 against the lips 18 and 20 which in turn bear against the lips 24 and 26.

To increase the strength of the lock, the plate 28 may be of increased length, the lips of both of the channel sections widened, or a plurality of screw and plate units employed rather than a single unit.

Having thus described my invention, I claim:

A lock adapted to restrain a first, smaller U-shaped channel section at any axial position within a second, larger U-shaped channel section, each channel section having a continuous in-turned lip formed along the full length of each of its flanges, said first channel section telescoping within said second section, said lock comprising a hole in the web of the first channel section; a plate having a width less than the distance between the flanges but greater than the distance between said lips of said first channel section disposed within said first channel section with its surface parallel to the webs of the channel sections; a central threaded hole in said plate, and a male threaded member engaged with said threaded hole in said plate and adapted to pass through said hole in the web of the first channel section to engage the web of said second channel member, whereby said threaded member may be rotated so as to force said plate and lips of the first channel member against the lips of said second channel section and thereby lock said channel sections together.

References Cited by the Examiner
UNITED STATES PATENTS

| 1,142,438 | 6/1915 | Kirsch. |
| 1,435,414 | 11/1922 | Morton. |
| 1,550,701 | 10/1925 | Hoyt. |
| 1,707,363 | 4/1929 | Opremchak. |
| 2,540,169 | 2/1951 | Kanaval. |
| 2,990,458 | 6/1961 | Mageoch. |

FOREIGN PATENTS

| 609,658 | 10/1948 | Great Britain. |

CARL W. TOMLIN, *Primary Examiner.*